United States Patent Office 3,782,976
Patented Jan. 1, 1974

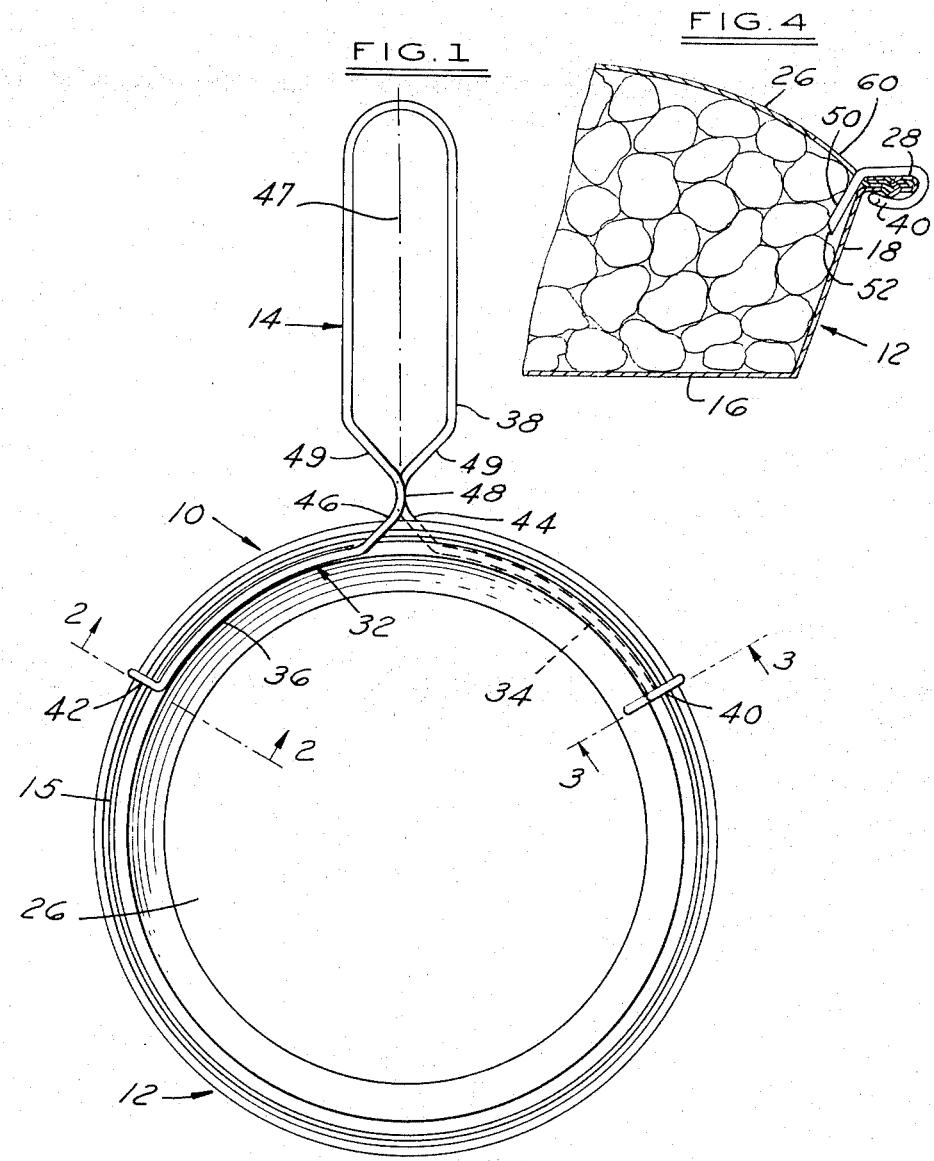
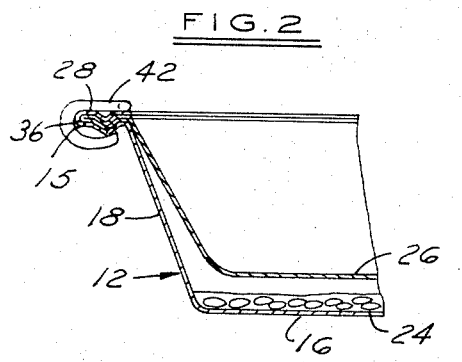
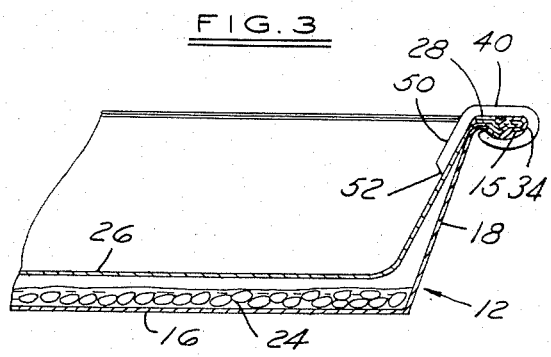

3,782,976
POPCORN PACKAGE AND HANDLE ASSEMBLY
Gary W. Maier, Mount Clemens, and David H. Jehn, Richmond, Mich., assignors to Dun-Hot, Inc., Mount Clemens, Mich.
Filed Dec. 14, 1971, Ser. No. 207,913
Int. Cl. B65b 25/22
U.S. Cl. 426—110
4 Claims

ABSTRACT OF THE DISCLOSURE

The pan and handle assembly includes an open-topped relatively shallow pan which has an annular flange or rim and a wire form handle secured to the rim of the pan. A transparent expandable plastic cover having substantially the same shallow outline as the pan extends across and into the pan, with the peripheral edge of the cover disposed between portions of the rim. A food product is confined between the pan and the cover. The wire handle has a generally arcuate portion engaging different areas of the rim and a handle portion integrally connected to the arcuate portion intermediate the ends thereof. The handle portion extends laterally outwardly from the pan and the ends of the arcuate portion terminate in a pair of generally U-shaped clinch means which receive the rim of the pan and are secured thereto to affix the handle to the pan. One of the U-shaped clinch means is provided with an integral end portion or piercing element which is adapted to engage the outer surface of the cover and puncture the cover when the cover expands in order to permit vapors to escape from the interior of the pan.

CROSS REFERENCE TO RELATED APPLICATIONS

The copending application of David H. Jehn, Ser. No. 65,012, filed Aug. 19, 1970, now Pat. No. 3,671,270, entitled "Popcorn Package" and assigned to the assignee of record, shows and describes a pan or popcorn package construction similar in certain respects to the construction of the present invention with the exception that no handle is provided for the pan. The flange of the pan described in the aforesaid application Ser. No. 65,012 includes a bent over edge portion which clampingly engages the marginal peripheral edge of the flexible cover. A plurality of spaced apart staked portions in the flange, which puncture both the flange and the marginal edge of the cover, positively hold the cover in place and provide a restricted fluid passage for pressure release during heating of the charge to pop the popcorn kernels.

BACKGROUND OF THE INVENTION

(1) Field of the invention

Disposable popcorn packages of the general type herein disclosed have become increasingly popular in recent years. Such popcorn packages include a disposable shallow pan fabricated of metal foil which serves as a cooking implement for application of heat to pop a charge of popcorn kernels, cooking oil and seasoning. A flexible transparent plastic cover is provided to overlie the charge and seal the charge in the pan during storage of the packages. When the kernels in a package are to be popped, the heat involved in the cooking action causes generation of vapors which, in turn, cause the flexible cover to ballon outwardly thus providing a space to receive the popped corn. Such disposable packages are widely used in public places such as taverns, restaurants and amusement centers as a means for providing fresh popcorn to customers. The packages are also sold in grocery stores for home or family consumption. One of the advantages of the present construction resides in that fact that a number of the pan and handle assemblies or packages may be nested together prior to use to thus form a compact storage unit for home or family use, with each handle being provided with an integral piercing element to puncture the expandable cover and thus permit vapor to escape during popping of the kernels.

(2) Description of the prior art

The basic pan or popcorn package construction is generally illustrated in U.S. Pat. No. 3,425,845, issued Feb. 4, 1969 and in U.S. Pat. No. 3,519,439, issued July 7, 1970 which are owned by the assignee of record. A machine for popping the kernels on a commercial scale and including as an element of the machine a piercing element for puncturing an expandable cover of a popcorn package is illustrated in U.S. Pat. 3,359,886, issued Dec. 26, 1967 and which is also owned by the assignee of record.

The basic pan and handle assembly is illustrated in the following U.S. patents: 2,791,350, issued May 7, 1957; 2,673,806, issued Mar. 30, 1954; 2,572,694, issued Oct. 23, 1951; 2,547,096, issued Apr. 3, 1951; 2,528,251, issued Oct. 31, 1950; 1,322,864, issued Nov. 25, 1919; 870,839, issued Nov. 12, 1907; and 489,256, issued Jan. 3, 1893.

Even though some of the prior art patents noted above illustrate pans or utensils having expandable covers none of them utilize a handle which engages the rim of the pan in the manner disclosed hereinafter or do the prior art patents disclose a handle provided with an integral piercing element for puncturing the expandable cover in order to permit vapors to escape from the interior of the pan.

SUMMARY OF THE INVENTION

The popcorn package and wire handle assembly or construction comprises an open-topped relatively shallow pan fabricated of a semi-rigid self-supporting metallic sheet material and a handle clinched or secured to the pan. The pan has an annular flange or rim. An expandable cover of flexible sheet material extends across and into the pan and has substantially the same relatively shallow outline to the pan to thereby permit nesting of a plurality of the assemblies. A charge of popcorn kernels and cooking oils is confined between the pan and the cover. The flange comprises a first generally radially outwardly extending wall portion and a second overlying reversely bent wall portion. The marginal peripheral edge portion of the cover is clamped between said portions.

The wire handle has a generally arcuate portion engaging different areas of the rim and a handle portion integrally connected to the arcuate portion intermediate the ends thereof. With such a construction the handle portion extends laterally outwardly from the pan and the ends of the arcuate portion terminate in a pair of generally U-shaped clinch means which receive the rim of the pan and are secured thereto to affix the handle to the pan. One of the U-shaped clinch means is provided with an integral end portion or piercing element which is adapted to engage the outer surface of the cover and puncture the cover when the cover expands in order to permit vapors to escape from the interior of the pan. The construction of the pan and handle assembly permits nesting of a plurality of same for storage purposes.

In the drawing:

FIG. 1 is a top plan view of the pan and handle assembly;

FIG. 2 is a sectional view taken on the line 2—2 of FIG. 1;

FIG. 3 is a sectional view taken on the line 3—3 of FIG. 1; and

FIG. 4 is a sectional view taken generally on the line 3—3 of FIG. 1 but illustrating the cover in an expanded position and punctured by the piercing element provided on the handle.

DESCRIPTION OF A PREFERRED EMBODIMENT

The popcorn package or pan and handle assembly 10 comprises an open-topped relatively shallow pan 12 and an attachable wire form handle 14 secured to the pan 12. The pan 12 has an annular continuous flange or rim 15 which extends around the mouth of the pan 12. The pan 12 is fabricated of a flexible metallic sheet material such as aluminum foil. The gauge of the foil is sufficient so that the pan 12 is sufficiently rigid to be self-supporting and so that the bottom wall 16 will not burn out when subjected to heat for the purpose of popping corn.

The sidewalls 18 of the pan flare outwardly from the bottom wall 16. The flange or rim 15 extends generally radially outwardly from the side walls 18. The flange 15 comprises a first outwardly bent wall portion and an inturned wall portion which overlies the first portion. A charge of popcorn kernels 24, preferably a single layer, is provided in the bottom of the pan 12. Hydrogenated vegetable cooking oil and popcorn seasoning complete the charge.

A flexible cover 26 extends across the pan 12 and downwardly into the pan. The cover 26 has substantially the same relatively shallow outline as the pan 12. The cover 26 is preferably fabricated of a transparent plastic material such as cellophane. The cellophane has sufficient thickness to withstand the relatively high pressures involved in popping the corn.

As will be noted in FIGS. 2, 3 and 4, the marginal peripheral portion 28 of the cover 26 is received between the wall portions of the annular continuous flange 15. The portion 28 comprises reversely bent edge portions to form two layers for added strength. The marginal edge 28 of the cover 26 extends all of the way into the flange 15 and terminates at the bend 34 of the flange 15. The marginal edge 28 of the cellophane cover 26 is frictionally held by the crimping action of the flange 15 to provide a sealed package.

The handle 14 is made from a relatively strong material such as steel wire having a generally circular cross-section. The handle 14 includes a generally circular or arcuate pan-engaging portion 32 having an angular extent between 90° and 180°. As illustrated the arcuate portion has an angular extent of 120°. The arcuate portion 32 is divided into a lower arcuate section 34 engaging the lower surface of a portion of the rim 15 and an upper arcuate section 36 engaging the upper surface of another portion of the rim 15 as best illustrated in FIG. 1. A handle portion 38 is integrally connected to the arcuate portion 32 intermediate the outer ends thereof as best illustrated in FIG. 1 and extends laterally outwardly from the pan 12 to provide a convenient handle for moving the popcorn package across a heating element.

The outer ends of the arcuate sections 34 and 36 terminate in a pair of generally U-shaped clinch means 40 and 42 respectively which receive the rim 15 of the pan 12 and are secured or clinched thereto to affix the handle 14 to the pan 12. The clinch means 40 and 42 forcibly grip the rim of the pan 12 and provide a positive mechanical connection therebetween. The arcuate sections 34, 36 occupy different horizontal planes since they engage the lower and upper rim surfaces respectively. The sections 34, 36 are provided with intermediate parts 44 and 46 respectively which abut at 48 at a zone spaced from the pan 12 and are secured thereto by welding or by other appropriate fastening means. The intermediate parts 44, 46 gradually merge into the handle portion 38 as shown in FIG. 1. The handle 14 due to the welded connection 48 is rigid and sturdy. The intermediate parts 44, 46 each include a pair of straight arms 49 on opposite sides of the welded connection 48 and which are inclined at a 45° angle with respect to the longitudinal axis 47 through the pan and handle assembly 10.

The clinch means 40 provided on the lower arcuate section 34 is provided with an extension 50 forming a piercing element. The extension 50 has a length of approximately ½" and is adapted to engage the upper surface of the cover 26 as illustrated in FIG. 3. The end 52 of the piercing element 50 is beveled or slanted to form a piercing edge for puncturing the cover 26.

In use of the popcorn package 10, heat is applied to the bottom wall 16. This heat initially causes the oil to boil with a portion thereof vaporizing. The pressure created by the evaporation of the oil causes the cover 26 to balloon upwardly as illustrated in FIG. 4. This upward ballooning provides space for popping of the corn.

Excess pressure is relieved via gaseous escape passage 60 provided in cover 26 as a result of the puncturing of same by the piercing element 50. Although the flange or rim 15 is crimped over the marginal edge 28 of the cover 26, the crimping pressure is not always sufficient to result in a fluid-tight seal at the relatively high pressures encountered during popping of the corn. Consequently, the excess pressure is relieved by escape of a gas through the passage 60.

During the popping action, the cover 26 will not come loose from the flange 15 because of the positive holding action provided by the flange 15. Tearing of the cover material is prevented by the amount of material of the cover 26 clamped into the outwardly extending rim 15 and the double thickness thereof.

After the cover 26 starts to balloon upwardly, the corn begins to pop. The popping action is continued until all of the corn is popped. The amount of the charge placed in the package 10 is sufficient to completely fill the package with the popped corn being somewhat compacted. After the kernels have been popped, the package is removed from the heat source. The cover 26 may be perforated by means of a sharp instrument such as a knife and torn away to permit eating of the popped corn. After use the entire package is discarded.

What we claim as our invention is:

1. A pan and handle assembly comprising a pan, said pan having a laterally extending annular rim, said rim comprising a first laterally outwardly extending continuous rim portion and a second overlying reversely bent continuous rim portion, an expandable cover for said pan, said cover extending across and into said pan and having a peripheral edge thereon disposed and clamped between said rim portions of said rim to provide a space between said cover and pan, a cookable food product confined in said space between said cover and pan, and a handle having a generally arcuate portion and a handle portion integrally connected to said arcuate portion intermediate the ends thereof, the major portion of said arcuate portion being in surface to surface contact with said rim, said handle portion extending laterally outwardly from said pan, said ends of said arcuate portion terminating in a pair of generally U-shaped clinch means which receive the rim of said pan and are secured thereto to affix said handle to said pan, and one of said U-shaped clinch means being provided with an end portion defining a puncture element extending into said pan and engaging the outer surface of said cover which is adapted to puncture the cover when said cover expands to permit vapors to escape from the interior of the pan.

2. A popcorn package comprising an open-topped relatively shallow pan fabricated of semi-rigid self-supporting metallic sheet material, said pan having an annular rim, a cover of flexible sheet material extending across and into the pan and having substantially the same relatively shallow outline as the pan, a charge of popcorn kernels and cooking oil confined between the pan and cover, said cover being outwardly expandable upon heating of the charge, said rim comprising a first generally radially outwardly extending rim portion and a second overlying reversely bent rim portion, the marginal peripheral edge portion of the cover being clamped between said rim portions, and a handle having a generally arcuate portion and a handle portion integrally connected to said arcuate portion intermediate the ends thereof, the major portion of said arcuate portion being in surface to surface contact with said rim, said handle portion extending laterally outwardly from said pan, said ends of said arcuate portion terminating in a pair of generally U-shaped clinch means which receive the rim of said pan and are secured thereto to affix said handle to said pan, and a puncture element secured to said arcuate section, said puncture element extending into said pan and engaging the outer surface of said cover, said puncture element being adapted to puncture the cover when said cover expands to permit vapors to escape from the interior of the pan.

3. A popcorn package comprising an open-topped relatively shallow pan fabricated of semi-rigid self-supporting metallic sheet material, said pan having an annular rim, a cover of flexible sheet material extending across and into the pan and having substantially the same relatively shallow outline as the pan, a charge of popcorn kernels and cooking oil confined between the pan and cover, said cover being outwardly expandable upon heating of the charge, said rim comprising a first generally radially outwardly extending rim portion and a second overlying reversely bent rim portion, the marginal peripheral edge portion of the cover being clamped between said rim portions, and a handle having a generally arcuate portion and a handle portion integrally connected to said arcuate portion intermediate the ends thereof, said handle portion extending laterally outwardly from said pan, said ends of said arcuate portion terminating in a pair of generally U-shaped clinch means which receive the rim of said pan and are secured thereto to affix said handle to said pan, said arcuate portion including a lower arcuate section engaging the lower surface of a portion of said rim and an upper arcuate section engaging the upper surface of another portion of said rim, the major portions of said upper and lower arcuate sections being in surface to surface contact with said upper surface of said rim and said lower surface of said rim respectively, one of said U-shaped clinch means being provided with an end portion defining a puncture element extending into said pan and engaging the outer surface of said cover and adapted to puncture the cover when said cover expands to permit vapors to escape from the interior of the pan.

4. The popcorn package defined in claim 3 wherein said puncture element is located on the U-shaped clinch means of said lower arcuate portion.

References Cited
UNITED STATES PATENTS

| | | | |
|---|---|---|---|
| 3,082,906 | 3/1963 | Reed | 99—171 H |
| 2,236,454 | 3/1941 | Stambaugh | 294—33 |
| 986,854 | 3/1911 | Peck | 294—33 |
| 3,194,429 | 7/1965 | Bouet | 229—3.5 MF X |
| 2,791,350 | 5/1957 | Mennen | 294—33 X |
| 477,572 | 6/1892 | Palmer | 220—95 |
| 1,640,016 | 8/1927 | Wills | 294—27 R |
| 3,420,401 | 1/1969 | Maslow | 294—33 X |
| 2,572,694 | 10/1951 | Brennan | 220—95 X |
| 1,511,128 | 10/1924 | Hosking, Jr. | 294—31 R |
| 3,671,270 | 6/1972 | Jehn | 99—171 H |
| 3,359,886 | 12/1967 | Dunn | 99—323.7 |

TIM R. MILES, Primary Examiner

S. L. WEINSTEIN, Assistant Examiner

U.S. Cl. X.R.

220—95; 229—3.5 MF, 52 AW; 294—27 H; 426—111